United States Patent
Kang et al.

(10) Patent No.: US 11,066,527 B2
(45) Date of Patent: *Jul. 20, 2021

(54) POLYLACTIC ACID PARTICLES AND MANUFACTURING METHOD THEREFOR

(71) Applicant: LG Hausys, Ltd., Seoul (KR)

(72) Inventors: Kyoung Min Kang, Seoul (KR); Sung Yong Kang, Seoul (KR); Hee-Jung Lee, Seoul (KR); Min Gyung Kim, Seoul (KR); Chang-Young Park, Seoul (KR); Jae Ho Lim, Seoul (KR); Jun Ho Choi, Seoul (KR); Jae Han Song, Seoul (KR); Yu Jin Go, Seoul (KR)

(73) Assignee: LG Hausys, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/491,726

(22) PCT Filed: Mar. 9, 2018

(86) PCT No.: PCT/KR2018/002848
§ 371 (c)(1),
(2) Date: Sep. 6, 2019

(87) PCT Pub. No.: WO2018/164542
PCT Pub. Date: Sep. 13, 2018

(65) Prior Publication Data
US 2020/0032049 A1   Jan. 30, 2020

(30) Foreign Application Priority Data

Mar. 9, 2017 (KR) .................. 10-2017-0030178
Mar. 9, 2017 (KR) .................. 10-2017-0030179
Sep. 18, 2017 (KR) .................. 10-2017-0119593
Mar. 8, 2018 (KR) .................. 10-2018-0027676

(51) Int. Cl.
| | |
|---|---|
| *C08J 3/12* | (2006.01) |
| *B01J 2/04* | (2006.01) |
| *B01J 2/20* | (2006.01) |
| *B29B 9/10* | (2006.01) |
| *C08G 63/06* | (2006.01) |
| *C08L 67/04* | (2006.01) |
| *B29B 9/12* | (2006.01) |
| *B29K 67/00* | (2006.01) |

(52) U.S. Cl.
CPC . *C08J 3/12* (2013.01); *B01J 2/04* (2013.01); *B01J 2/20* (2013.01); *B29B 9/10* (2013.01); *C08G 63/06* (2013.01); *C08L 67/04* (2013.01); *B29B 2009/125* (2013.01); *B29K 2067/046* (2013.01); *C08J 2367/04* (2013.01); *C08J 2375/04* (2013.01); *C08L 2203/30* (2013.01)

(58) Field of Classification Search
USPC ................................................. 528/271, 272
See application file for complete search history.

(56) References Cited

U.S. PATENT DOCUMENTS

| | | | |
|---|---|---|---|
| 3,647,340 A | * | 3/1972 | Sakurai ................. B29C 48/912 425/326.1 |
| 3,937,772 A | | 2/1976 | Urban et al. |
| 5,525,274 A | | 6/1996 | Grimmer |
| 5,609,979 A | | 3/1997 | Lawson |
| 6,190,773 B1 | | 2/2001 | Imamura et al. |
| 6,527,995 B1 | | 3/2003 | Kaufhold et al. |
| 6,733,845 B1 | | 5/2004 | Caramaro et al. |
| 8,710,144 B2 | | 4/2014 | Hesse et al. |
| 2002/0099162 A1 | | 7/2002 | Iwanaga et al. |
| 2005/0142206 A1 | | 6/2005 | Brown et al. |
| 2005/0207931 A1 | | 9/2005 | Hesse et al. |
| 2006/0067895 A1 | | 3/2006 | Miyamoto et al. |
| 2006/0204604 A1 | | 9/2006 | Yamanaka et al. |
| 2006/0235188 A1 | | 10/2006 | Weinhold et al. |
| 2008/0026955 A1 | | 1/2008 | Munoz et al. |

(Continued)

FOREIGN PATENT DOCUMENTS

| | | |
|---|---|---|
| DE | 102007027543 A1 | 5/2008 |
| EP | 1707257 A2 | 10/2006 |

(Continued)

OTHER PUBLICATIONS

KR 2015-0126517 Song Kang Hyun et al., Microparticle for Dry Impregation and Thermoplastic Composite Including the Same and the Preparation Method Thereof. (Year: 2014).*
International Search Report for PCT/KR2018/002848 dated Jun. 28, 2018.
International Search Report for Application No. PCT/KR2018/002843, dated Jul. 24, 2018, pp. 1-2.
International Search Report for Application No. PCT/KR2018/002845, dated Jul. 24, 2018, pp. 1-4.
International Search Report for PCT/KR2018/002846 dated Jul. 24, 2018.
Anonymous, "Hot Cutting PP/PE Plastic Recycling Machine Air Cooled plastic granulator machine," Dec. 22, 2016, pp. 1-2, XP055744893.

(Continued)

*Primary Examiner* — Terressa Boykin
(74) *Attorney, Agent, or Firm* — Lerner, David, Littenberg, Krumholz & Mentlik, LLP

(57) ABSTRACT

The present invention provides polylactic acid particles, which are formed in a continuous matrix phase from a polylactic acid resin and have a particle diameter of 1 to 100 μm. In a differential scanning calorimetry (DSC) curve of the polylactic acid particles, derived from the analysis by DSC using a temperature rise of 10° C./min, a peak of the cold crystallization temperature ($T_{cc}$) is shown at a temperature between the glass transition temperature ($T_g$) and the melting point ($T_m$). The polylactic acid particles have an aspect ratio of more than or equal to 1.00 and less than 1.05 and a roundness of 0.95 to 1.00. The polylactic acid particles have a flow time of 20 to 30 seconds.

10 Claims, 3 Drawing Sheets

(56) References Cited

U.S. PATENT DOCUMENTS

| | | | |
|---|---|---|---|
| 2008/0103277 A1 | 5/2008 | Campbell et al. | |
| 2008/0122132 A1 | 5/2008 | Kinoshita et al. | |
| 2008/0152910 A1 | 6/2008 | Hesse et al. | |
| 2009/0280423 A1 | 11/2009 | Yahiro et al. | |
| 2010/0133717 A1 | 6/2010 | Boczon et al. | |
| 2010/0227985 A1 | 9/2010 | Nishiguchi et al. | |
| 2012/0270048 A1 | 10/2012 | Saigusa et al. | |
| 2013/0234350 A1 | 9/2013 | Osswald | |
| 2013/0289055 A1 | 10/2013 | Boit et al. | |
| 2013/0309497 A1* | 11/2013 | Takezaki | C08G 63/81 428/402 |
| 2014/0024797 A1 | 1/2014 | Nishigucht et al. | |
| 2015/0240021 A1 | 8/2015 | Hesse et al. | |
| 2016/0208057 A1 | 7/2016 | Baer et al. | |
| 2016/0208070 A1 | 7/2016 | Shin et al. | |
| 2017/0291996 A1 | 10/2017 | Hwang et al. | |
| 2018/0133685 A1 | 5/2018 | Lu et al. | |
| 2019/0276611 A1* | 9/2019 | Kuwagaki | A61K 8/85 |
| 2020/0032005 A1 | 1/2020 | Kim et al. | |
| 2020/0032049 A1 | 1/2020 | Kang et al. | |
| 2020/0071470 A1 | 3/2020 | Lim et al. | |
| 2020/0316819 A1 | 10/2020 | Lee et al. | |

FOREIGN PATENT DOCUMENTS

| | | | |
|---|---|---|---|
| EP | 1920825 A1 | 5/2008 | |
| EP | 2732945 A1 | 5/2014 | |
| EP | 3202824 A1 | 8/2017 | |
| JP | S59226024 A | 12/1984 | |
| JP | 2000007789 A | 1/2000 | |
| JP | 2000052341 A | 2/2000 | |
| JP | 2000313729 A | 11/2000 | |
| JP | 2001288273 A | 10/2001 | |
| JP | 2002283341 A | 10/2002 | |
| JP | 2004269598 A | 9/2004 | |
| JP | 2004269865 A | 9/2004 | |
| JP | 2005097480 A | 4/2005 | |
| JP | 2006002097 A | 1/2006 | |
| JP | 2006124366 A | 5/2006 | |
| JP | 2007535585 A | 12/2007 | |
| JP | 2008070583 A | 3/2008 | |
| JP | 2008137377 A | 6/2008 | |
| JP | 2008163290 A | 7/2008 | |
| JP | 2009029860 A | 2/2009 | |
| JP | 2009035606 A | 2/2009 | |
| JP | WO2009051104 A1 | 3/2011 | |
| JP | 2012224809 A | 11/2012 | |
| JP | 2014504305 A | 2/2014 | |
| JP | 2014047304 A | 3/2014 | |
| JP | 2016536412 A | 11/2016 | |
| JP | 2016536420 A | 11/2016 | |
| JP | 2018135493 A | 8/2018 | |
| KR | 20000073060 A | 12/2000 | |
| KR | 20010031742 A | 4/2001 | |
| KR | 20010049784 A | 6/2001 | |
| KR | 20070068490 A | 6/2007 | |
| KR | 101292498 B1 | 8/2013 | |
| KR | 2015-0126517 * | 5/2014 | C08J 3/122 |
| KR | 20150117782 A | 10/2015 | |
| KR | 20150126517 A | 11/2015 | |
| WO | 2016052935 A1 | 4/2016 | |
| WO | 2016052958 A1 | 4/2016 | |

OTHER PUBLICATIONS

Extended European Search Report with Written Opinion for Application No. 18764218.6 dated Nov. 20, 2020, 11 pages.
Vasanthavada et al, "Application of Melt Granulation Technology Using Twin-screw Extruder in Development of High-dose Modified-release Tablet Formulation", Journal of Pharmaceutical Sciences, May 23, 2011, pp. 1923-1934, vol. 100, No. 5, XP055128566.
Database WPI, Week 200020, Feb. 22, 2000 (Feb. 22, 2000), Thomson Scientific, London. GB; AN 2000-232139, XP002801299, 2 pages.
Database WPI, Week 201602, Nov. 12, 2015 (Nov. 12, 2015), Thomson Scientific, London, GB; AN 2015-71562P, XP002801284, 2 pages.
Database WPI, Week 201629, Apr. 7, 2016 (Apr. 7, 2016), Thomson Scientific, London, GB; AN 2016-20784P, XP002801283, 4 pages.
Extended European Search Report with Written Opinion for Application No. 18763304.5 dated Dec. 14, 2020, 14 pages.
Extended European Search Report with Written Opinion for Application No. 18763568.5 dated Dec. 11, 2020, 19 pages.

* cited by examiner

【Figure 1】
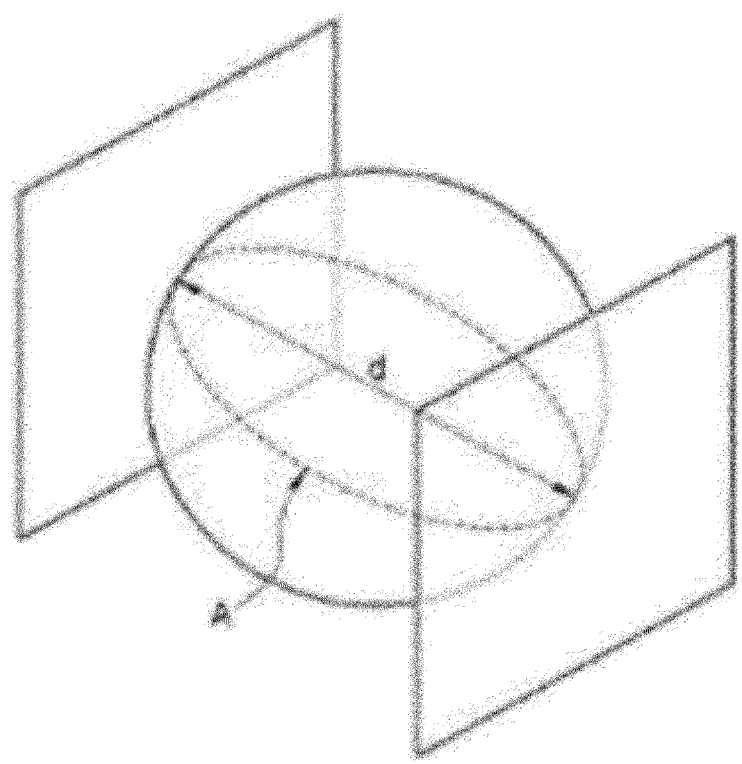

[Figure 2]
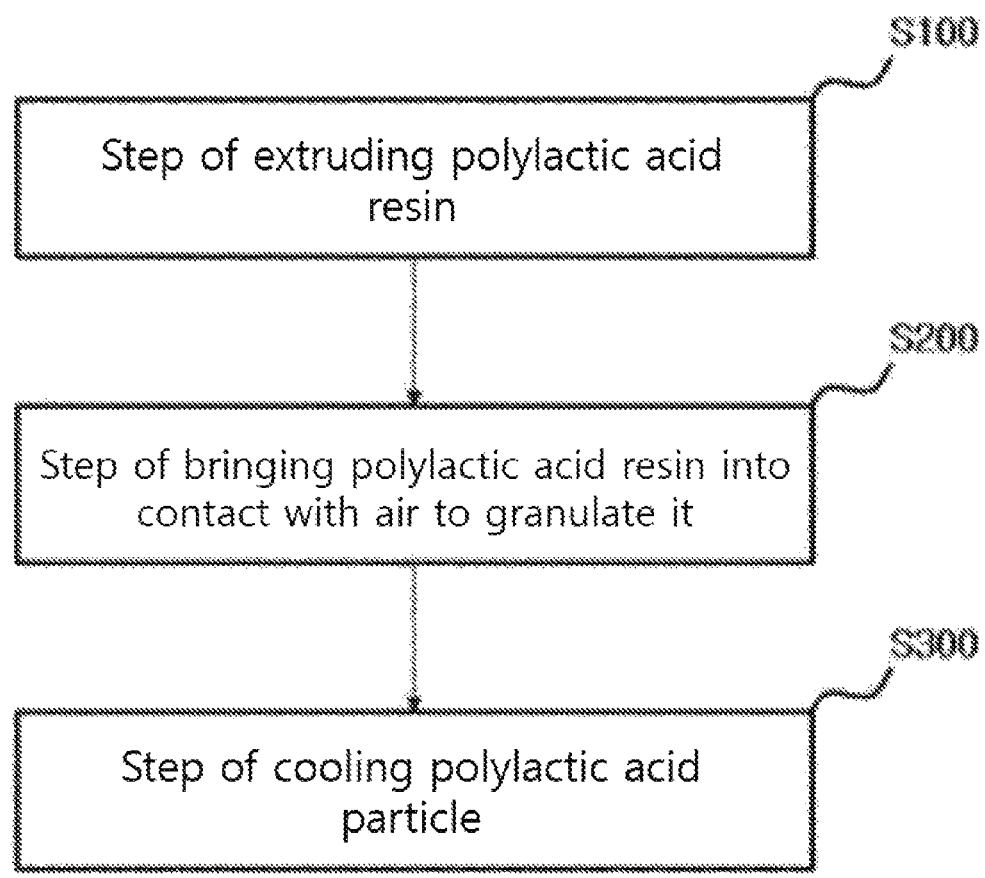

【Figure 3】
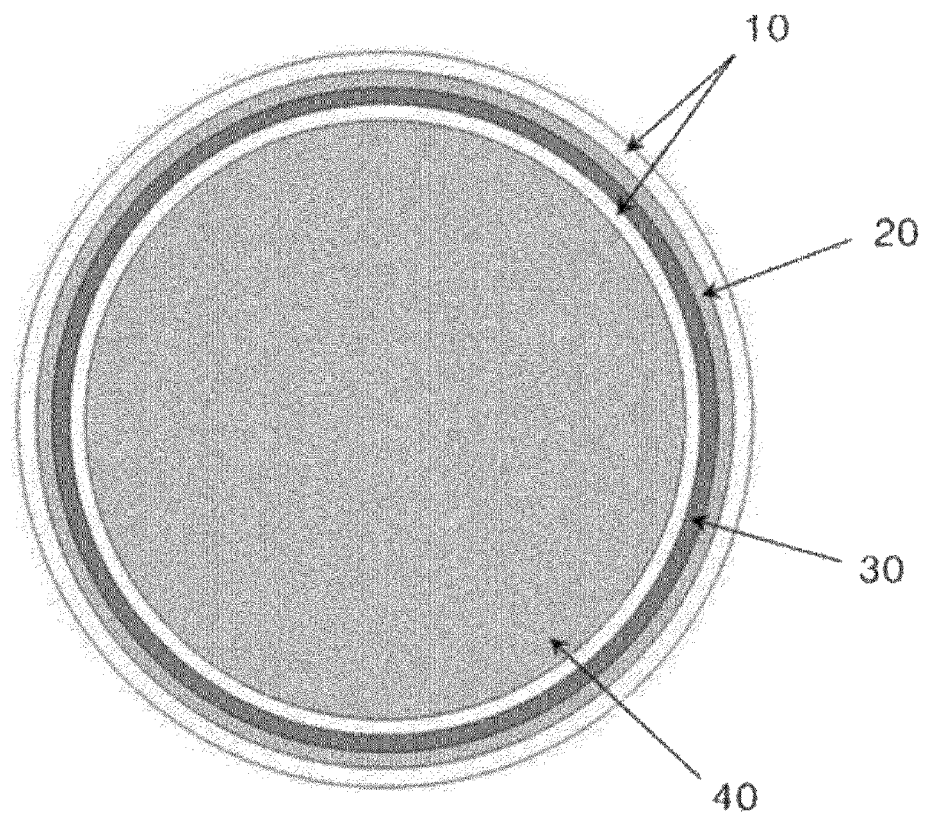

POLYLACTIC ACID PARTICLES AND MANUFACTURING METHOD THEREFOR

CROSS-REFERENCE TO RELATED APPLICATIONS

This application is a national phase entry under 35 U.S.C. § 371 of International Application No. PCT/KR2018/002848, filed Mar. 9, 2018, which claims the benefits of priorities based on Korean Patent Application Nos. 10-2017-0030178 and 10-2017-0030179, filed on Mar. 9, 2017, Korean Patent Application No. 10-2017-0119593, filed on Sep. 18, 2017, and Korean Patent Application No. 10-2018-0027676, filed on Mar. 8, 2018, the entire contents of which are incorporated herein by reference.

TECHNICAL FIELD

The present invention relates to polylactic acid particles and a manufacturing method therefor.

BACKGROUND ART

The thermoplastic polymer is used in a variety of industries such as cosmetics, fillers in paints and coatings, hot melt adhesives, thermal molded articles and polymeric toners. Among the thermoplastic polymers, polylactic acid is a copolymer of L-lactic acid and D-lactic acid, which are photoactive carbons, and has a melting point of 210 □ or more. The polylactic acid is a biodegradable polymer and also has high utility value because it has the advantages of other thermoplastic polymers. The thermoplastic polymer comprising the polylactic acid is manufactured in the form of particles and utilized in various industrial fields. Depending on the physical properties of the particles manufactured, the utilization value of the particles and the quality of the products manufactured by the particles can be determined.

In order to manufacture thermoplastic polymer particles comprising the polylactic acid, conventionally the following three methods have been utilized. Specifically, as a manufacturing method of thermoplastic polymer particles, there are a crushing method represented by a freeze-crushing method; a solvent dissolution-precipitation method which makes it precipitate by dissolving in a high temperature solvent and then cooling or which makes it precipitate by dissolving in a solvent and then adding a bad solvent; a melt kneading method which obtains thermoplastic resin particles by mixing the thermoplastic resin and the incompatible resin in the mixer to form a composition having the thermoplastic resin in the dispersed phase and the thermoplastic resin and the incompatible resin in the continuous phase, and then removing the incompatible resin; and the like.

If the particles are manufactured by the crushing method, it is difficult to secure the uniformity of the size and shape of the manufactured polylactic acid particles. In addition, the crushing method requires a high cost compared to the particle obtaining process because liquid nitrogen is used during cooling, and if a compounding process for adding pigments, antioxidants, etc. to the raw material of the polylactic acid resin is added, since the process proceeds batchwise, the productivity is low as compared to that of the continuous particle obtaining process. If the particles are manufactured by the solvent dissolution precipitation method and the melt kneading method, a problem that in addition to the polylactic acid particles, other components such as a solvent may be detected as impurities can be caused. The polylactic acid particles can be applied in various industries, in particular in basic cosmetics and color cosmetics. Therefore, since the impurities can directly affect the skin, the content of impurities in the particles may be a more important problem.

Since the physical properties of polylactic acid particles have a direct relationship to the quality of products such as basic cosmetics and color cosmetics and the conventional manufacturing method cannot manufacture the polylactic acid particles having appropriate particle characteristics, there is a need in the art for improved polylactic acid particles and a manufacturing method thereof.

PRIOR ART DOCUMENT

Patent Document (Patent Document 1) Japanese Laid-open Patent Publication No. 2001-288273
(Patent Document 2) Japanese Laid-open Patent Publication No. 2000-007789
(Patent Document 3) Japanese Laid-open Patent Publication No. 2004-269865

DISCLOSURE

Technical Problem

The present invention provides polylactic acid particles having physical properties suitable for application to basic cosmetics, color cosmetics and the like, which effectively prevent the incorporation of impurities other than the resin component in the particles by extruding a polylactic acid resin, granulating the extruded resin by contact with air, and cooling it to manufacture the polylactic acid particles, and which could not be obtained by conventional methods.

Technical Solution

According to the first aspect of the invention, the present invention provides a polylactic acid particles formed as a continuous matrix phase from a polylactic acid resin and having a particle diameter of 1 to 100 μm.

In one embodiment of the present invention, the polylactic acid particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10 □/min by the DSC.

In one embodiment of the present invention, the polylactic acid particles have an aspect ratio of 1.00 or more and less than 1.05, and a roundness of 0.95 to 1.00.

In one embodiment of the present invention, the polylactic acid particles have a compression degree of 10 to 15%.

In one embodiment of the present invention, the polylactic acid particles have a flow time of 20 to 30 seconds.

According to a second aspect of the invention, the present invention provides steps of supplying a polylactic acid resin to an extruder and extruding it; supplying the extruded polylactic acid resin and air to the nozzle, bringing the polylactic acid resin into contact with air to granulate the polylactic acid resin, and then discharging granulated polylactic acid resins; and supplying the discharged polylactic acid particles to a cooling unit to cool the polylactic acid particles, and then collecting cooled polylactic acid particles.

Advantageous Effects

The polylactic acid particles according to the present invention are prepared by granulating the polylactic acid resin by contact with air after extrusion and thus basically do not have impurities such as a solvent in the particles. In addition, the particles of the present invention have a high degree of flowability due to the short flow time, while having a similar degree of compression to that of the particles manufactured by conventional manufacturing methods.

If the polylactic acid particles having the above physical properties are utilized in basic cosmetics and color cosmetics, the compressibility, fluidity and dispersibility of the product may be increased to improve the quality of the product.

DESCRIPTION OF DRAWINGS

FIG. 1 is an image schematically showing the shape of a polylactic acid particle of the present invention.

FIG. 2 is a process flow chart schematically showing a method for manufacturing polylactic acid particles according to the present invention.

FIG. 3 is a cross-sectional view of a nozzle outlet showing a supply position of a polylactic acid resin and air to a nozzle according to an embodiment of the present invention.

BEST MODE

Embodiments provided according to the present invention can all be achieved by the following description. It is to be understood that the following description describes preferred embodiments of the invention, and the invention is not necessarily limited thereto.

In the following specification, for the numerical range, the expression "to" is used to include both the upper and lower limits of the range, and when not including the upper limit or the lower limit, the expression "less than", "more than", "no more than", or "no less than" is used in order to specifically indicate whether or not to include the upper limit or the lower limit.

The present invention provides polylactic acid particles having physical properties suitable for use in basic cosmetics and color cosmetics and the like, which could not be obtained by conventional particle manufacturing methods. Hereinafter, the polylactic acid particles according to the present invention will be described in detail.

Polylactic Acid Particles

The present invention provides polylactic acid particles prepared by granulating a polylactic acid resin by contact with air after extrusion. The method for manufacturing polylactic acid particles according to the present invention is an improved method as compared to the conventional crushing method, solvent dissolution precipitation method, and melt kneading method, and the specific manufacturing method will be described in the section "Manufacturing method of polylactic acid particles" below.

The polylactic acid particles according to the present invention has a particle diameter of 1 to 100 μm. If the particles have a particle diameter of less than 1 μm, the polylactic acid particles are excessively dispersed, so that the particle properties of the polylactic acid are difficult to be realized in the product. If the particles have a particle diameter of more than 100 μm, since the particles are too large, for example, when applied to cosmetics, etc., the application property is lowered, which is not suitable.

In the present invention, the shape of the particles is evaluated by the following aspect ratio and roundness. The closer the aspect ratio and roundness is to 1, the closer the shape of the particle is to the sphere. The aspect ratio is calculated by the following Formula 1.

$$\text{Aspect ratio} = \text{major axis/minor axis.} \quad \text{[Formula 1]}$$

In addition, the roundness is calculated by the following Formula 2.

$$\text{Roundness} = 4 \times \text{area}/(\pi \times \text{major axis}^2) \quad \text{[Formula 2]}$$

In order to explain the Formulas in detail, FIG. 1 is provided which schematically illustrates polylactic acid particles. According to FIG. 1, in Formulas 1 and 2, the "major axis" means the longest distance among the vertical distances (d) between two parallel tangent lines of the 2D image (cross-section) of the polylactic acid particle, and the "minor axis" means the shortest distance among the vertical distances (d) between two parallel tangent lines of the 2D image (cross-section) of the polylactic acid particle. In addition, in Formula 2, the "area" means the area of the cross section including the major axis of the polylactic acid particle. FIG. 1 illustrates an area (A) as an example when the vertical distance (d) between two parallel tangent planes of the polylactic acid particles is a major axis.

According to one embodiment of the present invention, the polylactic acid particles according to the present invention may have an aspect ratio of 1.00 or more and less than 1.05, more specifically 1.02 or more and less than 1.05, and may have a roundness of 0.95 to 1.00, more specifically 0.98 to 1.00. If the shape of the polylactic acid particles satisfies the above-described aspect ratio and roundness ranges, the flowability and uniformity of the polylactic acid particles are increased, so that the particles are easily handled when applied to basic cosmetics, color cosmetics and the like, and the basic cosmetics and color cosmetics to which the particles are applied may be improved in quality due to the excellent flowability and dispersibility of the particles.

The numerical values according to Formulas 1 and 2 can be measured by image-processing an image of polylactic acid particles using ImageJ (National Institutes of Health (NIH)), and converting them into a binary image and then digitizing the degree of spherical shape of individual particles.

The polylactic acid particles according to the present invention are particles formed as a continuous matrix phase from the polylactic acid resin. Forming as a continuous matrix phase from the polylactic acid resin means that the polylactic acid resin forms a continuous dense structure without additional components. By extruding the polylactic acid resin, melting and granulating the melt with air, polylactic acid particles are produced continuously with a dense structure. In contrast, according to the conventional manufacturing method, since particles are formed by adding additional components or particles are formed through a discontinuous process of cooling and crushing, the particles are not formed as a continuous matrix phase.

The particles formed as a continuous matrix phase from a polylactic acid resin have a high purity because they do not contain impurities during the manufacture of the particles. Here, "impurity" means a component other than polylactic acid, which may be incorporated in the manufacture of the particles. Exemplary impurities are a solvent for dispersing the polylactic acid resin, heavy metal components included in the grinding or grinding process, unreacted monomers included in the polymerization process, and the like. According to one embodiment of the present invention, the impurity content of the polylactic acid particles of the present invention may be 50 ppm or less, preferably 20 ppm or less, more preferably 5 ppm or less.

In addition, the particles may additionally have other properties as well as purity. As one of these properties, the polylactic acid particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10 □/min by the DSC. The polylactic acid particles are spherical solid particles at room temperature. When these particles are subjected to temperature rise analysis using differential scanning calorimetry, the polylactic acid particles have a peak of cold crystallization temperature ($T_{cc}$) at a temperature between the glass transition temperature ($T_g$) and the melting point ($T_m$), which means that the polylactic acid particles have a property of generating heat before melting. In the present specification, the peak of cold crystallization temperature ($T_{cc}$) refers to only the peak of cold crystallization temperature ($T_{cc}$) that appears when the temperature rise analysis is first performed on the thermoplastic polymer particles for the first time, and the peak of the cold crystallization temperature ($T_{cc}$), which may occur as the internal structure of the particle is modified by repetitive temperature rise thereafter, is not included in the characteristics of the particles described herein. If the peak of cold crystallization temperature ($T_{cc}$) is caused by repetitive temperature rise, since energy for repetitive temperature rise is consumed, and thus it does not have an advantage in terms of energy when processing the particles. According to one embodiment of the present invention, the cold crystallization temperature ($T_{cc}$) is shown in a 30% to 70% section between the glass transition temperature ($T_g$) and the melting point ($T_m$). In this section, 0% is the glass transition temperature ($T_g$) and 100% is the melting point ($T_m$). In addition, according to the DSC curve, the thermoplastic polymer particles may have a difference ($\Delta H1-\Delta H2$) of 3 to 100 J/g between an endothermic amount ($\Delta H1$) and an exothermic amount ($\Delta H2$). By these features, if the polylactic acid particles are utilized in the heating process, it is possible to obtain an advantage that can be processed at a low temperature as compared to the processing temperature of homogeneous polylactic acid particles.

The polylactic acid particles of the present invention have a compression degree similar to that of conventional polylactic acid particles. The compression degree may be calculated by Formula 3 below. According to one embodiment of the present invention, the polylactic acid particles have a compression degree of 10 to 15%.

Compression degree=$(P-A)/P\times100$ [Formula 3]

wherein P means compressed bulk density and A means relaxed bulk density.

As described above, the polylactic acid particles according to the present invention can fill the voids between the particles well because of the good flowability, thereby maintaining a compression level of a certain level or more. The compression degree of the polylactic acid particles may affect the quality of the molded article during the manufacture of the molded article through the particles. When using polylactic acid particles having a compression degree of a certain degree or more as in the present invention, in the case of molded articles, it may have the effect of minimizing voids that may occur in the product, and in the case of products such as cosmetics, the compressibility between the skin and the product may be improved. According to one embodiment of the present invention, the polylactic acid particles have a compressed bulk density of 0.525 to 0.6 g/cm$^3$.

The polylactic acid particles according to the present invention have a flow time of 20 to 30 seconds. The flow time is a numerical value representing the fluidity of the powder. The short flow time means that the frictional resistance between particles is small. If the frictional resistance between particles is small, it is easy to handle the particles. Since the polylactic acid particles according to the present invention have a short flow time as compared to the conventional polylactic acid particles, the fluidity is good and thus the handling of the particles is easy, and the applicability can be improved when applied to products such as basic cosmetics and color cosmetics.

The polylactic acid particles according to the present invention have a crystallization degree of 5 to 10%. The crystallization degree of the polylactic acid particles is lower than that of particles having a large particle diameter in pellet form, and the polylactic acid particles according to the present invention can be easily processed due to the low crystallization degree.

The polylactic acid particles having the above-mentioned characteristics are manufactured by the following manufacturing method. Hereinafter, a manufacturing method of the polylactic acid particles according to the present invention will be described in detail.

Manufacturing Method of Polylactic Acid Particles

FIG. 2 schematically illustrates a process flow diagram for the manufacturing method. The manufacturing method comprises supplying a polylactic acid resin to an extruder and extruding it (S100); supplying the extruded polylactic acid resin and air to the nozzle, bringing the polylactic acid resin into contact with air to granulate the polylactic acid resin, and then discharging the granulated polylactic acid resins (S200); and supplying the discharged polylactic acid particles to a cooling unit to cool the polylactic acid particles, and then collecting cooled polylactic acid particles (S300). Hereinafter, each step of the manufacturing method will be described in detail.

In order to manufacture polylactic acid particles according to the present invention, first, a polylactic acid resin as a raw material is supplied to an extruder and extruded. By extruding the polylactic acid resin, the polylactic acid resin has physical properties suitable for processing particles in the nozzle. The polylactic acid resin used as a raw material may preferably have a weight average molecular weight (Mw) of 10,000 to 200,000 g/mol in consideration of appropriate physical properties of the prepared particles.

The extruder supplied with the polylactic acid resin controls physical properties such as the viscosity of the polylactic acid resin by heating and pressing the polylactic acid resin. The type of extruder is not particularly limited as long as it can adjusted to have physical properties suitable for granulation at the nozzle. According to one embodiment of the present invention, the extruder may be a twin-screw extruder for efficient extrusion. The inside of the extruder may be preferably maintained at 150 to 300□, preferably 170 to 270□, more preferably 200 to 250 □. If the internal temperature of the extruder is less than 150□, the viscosity of the polylactic acid resin is high, which is not suitable for granulation at the nozzle, and also the polylactic acid resin has low flowability in the extruder, thereby being not efficient for extrusion. In addition, if the internal temperature of the extruder is higher than 300 □, the flowability of the polylactic acid resin is high, and thus efficient extrusion is possible, but if the polylactic acid resin is granulated in the nozzle, it is difficult to control fine physical properties.

The extrusion amount of the polylactic acid resin may be set to facilitate the physical properties of the polylactic acid resin in consideration of the size of the extruder. According to one embodiment of the present invention, the polylactic acid resin is extruded at a rate of 1 to 10 kg/hr. The viscosity of the extruded polylactic acid resin may be 0.5 to 20 Pa·s, preferably 1 to 15 Pa·s, more preferably 2 to 10 Pa·s. If the viscosity of the polylactic acid resin is less than 0.5 Pa·s, it is difficult to process the particles at the nozzle. If the viscosity of the polylactic acid resin is more than 20 Pa·s, the flowability of the polylactic acid resin at the nozzle is low, and thus the processing efficiency is lowered. The temperature of the extruded polylactic acid resin may be 150 to 250□.

The extruded polylactic acid resin is supplied to the nozzle in the extruder. Along with the polylactic acid resin, air is also supplied to the nozzle. The air contacts the polylactic acid resin in the nozzle to granulate the polylactic acid resin. Hot air is supplied to the nozzle to properly maintain the physical properties of the polylactic acid resin. According to one embodiment of the present invention, the temperature of the air may be 250 to 450□, preferably 260 to 400□, more preferably 270 to 350□. If the temperature of the air is less than 250□ or more than 450□, when polylactic acid particles are produced from polylactic acid resin, the physical properties of the surface in contact with air may be changed in an undesirable direction, which causes a problem. In particular, when the temperature of the air exceeds 450□, excessive heat is supplied to the contact surface with the air, the decomposition phenomenon of the polylactic acid may occur on the surface of the particles.

The supply position of the polylactic acid resin and the air supplied to the nozzle is set such that the polylactic acid particles can have an appropriate size and shape, and the formed particles can be evenly dispersed. FIG. 3 shows a cross-sectional view of the nozzle outlet, and the supply position of the polylactic acid resin and air according to an embodiment of the present invention will be described in detail with reference to FIG. 3. For the detailed description herein, the positions of the nozzles are expressed as "inlet", "outlet", and "distal end". The "inlet" of the nozzle means the position where the nozzle starts, and the "outlet" of the nozzle means the position where the nozzle ends. In addition, the "distal end" of the nozzle means the position from two thirds of the nozzle to the outlet. Here, point 0 of the nozzle is the inlet of the nozzle and point 1 of the nozzle is the outlet of the nozzle.

As shown in FIG. 3, the cross-section perpendicular to the flow direction of polylactic acid resin and air is a circle. The air is supplied through a first air stream (40) fed into the center of the circle and a second air stream (20) fed into the outer portion of the circle, and the polylactic acid resin is supplied between the first air stream (40) and the second air stream (20). From the time the polylactic acid resin and the air are supplied to the inlet of the nozzle to just before the outlet of the nozzle, each feed stream (the polylactic acid resin stream (30), the first air stream (40) and the second air stream (20)) is separated by the internal structure of the nozzle. Just before the outlet of the nozzle, the polylactic acid resin stream and the second air stream are merged to bring the polylactic acid resin into contact with air, thereby granulating the polylactic acid resin. In contrast, the first air stream is separated by the internal structure of the nozzle from the polylactic acid resin stream and the second air stream until the air and the polylactic acid resin are discharged from the nozzle. The first air stream serves to prevent the particles of the polylactic acid resin granulated by the second air stream from adhering to the outlet of the nozzle and evenly disperse the discharged particles after discharging from the nozzle and before feeding to the cooling unit.

The extruded polylactic acid resin in the extruder is all supplied to the above-mentioned position of the nozzle, the flow rate of air supplied to the nozzle can be adjusted depending on the flow rate of the extruded polylactic acid resin. According to one embodiment of the present invention, the air is supplied to the nozzle at a flow rate of 1 to 300 m$^3$/hr, preferably 30 to 240 m$^3$/hr, more preferably 60 to 180 m$^3$/hr. The air is supplied separately into the first air stream and the second air stream within the flow rate range of the air. As described above, the polylactic acid resin is granulated by the second air stream. The ratio of the polylactic acid resin and the second air stream as well as the temperature of the second air stream may determine the physical properties of the particles. According to one embodiment of the present invention, the ratio of the cross-sectional areas of the polylactic acid resin and the second air stream based on the cross section of the outlet of the nozzle may be 4:1 to 6:1, preferably 4.3:1 to 5:1. If the ratio of the polylactic acid resin and the second air stream is controlled within the above range, polylactic acid particles having a suitable size and shape that have high utility for basic cosmetics, color cosmetics, and the like can be manufactured.

Since the polylactic acid resin is granulated at the nozzle, the inside of the nozzle is controlled to a temperature suitable for granulating the polylactic acid resin. Since a sharp rise in temperature can change the structure of the polylactic acid, the temperature from the extruder to the outlet of the nozzle can be raised step by step. Therefore, the internal temperature of the nozzle is set on average to a range higher than the internal temperature of the extruder. Since the distal end temperature of the nozzle is defined separately below, the internal temperature of the nozzle herein means the average temperature of the rest of the nozzle except for the distal end of the nozzle unless otherwise specified. According to one embodiment of the present invention, the inside of the nozzle may be maintained at 250 to 350□. If the internal temperature of the nozzle is less than 250□, sufficient heat is not transferred to the polylactic acid resin to satisfy the physical properties. If the internal temperature of the nozzle is above 350□, excessive heat can be supplied to the polylactic acid resin, thereby changing the structure of the polylactic acid.

The distal end of the nozzle may be maintained at a temperature higher than the average temperature inside the nozzle to improve the external and internal physical properties of the resulting particles. The distal end temperature of the nozzle may be determined between the glass transition temperature ($T_g$) and the pyrolysis temperature ($T_d$) of the polylactic acid, and specifically may be determined according to Formula 4 below:

Distal end temperature=glass transition temperature ($T_g$)+(pyrolysis temperature($T_d$)−glass transition temperature($T_g$))×$A$     [Formula 4]

wherein A may be 0.5 to 1.5, preferably 0.65 to 1.35, more preferably 0.8 to 1.2. If A is less than 0.5, it is difficult to expect the improvement of the external and internal physical properties of the particles according to the temperature rise at the distal end of the nozzle. If A is greater than 1.5, the heat substantially transmitted to the polylactic acid at the distal end of the nozzle may be excessively increased, thereby deforming the structure of the polylactic acid. The glass transition temperature and pyrolysis temperature may vary depending on the type, degree of polymerization, structure, and the like of the polymer. According to one embodiment of the present invention, the polylactic acid of the present invention may be a polylactic acid having a glass transition temperature of 30 to 70□ and a pyrolysis temperature of 250 to 350□. Since the distal end of the nozzle is kept higher than the average temperature of the nozzle, in some cases, the distal end of the nozzle may be provided with additional heating means.

The discharged polylactic acid particles at the nozzle are fed to the cooling unit. The nozzle and the cooling unit can be spaced apart, in which case the discharged polylactic acid particles are primarily cooled by ambient air before being supplied to the cooling unit. the hot air as well as the polylactic acid particles are discharged together from the nozzle. By separating the nozzle and the cooling unit, the hot air can be discharged to the outside instead of the cooling unit, thereby increasing the cooling efficiency in the cooling unit. According to one embodiment of the present invention, the cooling unit is located spaced apart from the nozzle at a distance of 100 to 500 mm, preferably 150 to 400 mm, more preferably 200 to 300 mm. If the separation distance is shorter than the distance, a large amount of hot air is injected into the cooling chamber, thereby lowering the cooling efficiency. If the separation distance is longer than the distance, the amount cooled by the ambient air is increased, the rapid cooling by the cooling chamber is not achieved. In addition, the injection angle when discharging the polylactic acid particles in the nozzle may be 10 to 60°. When discharging polylactic acid particles at a corresponding angle, the effect of the separation between the nozzle and the cooling unit can be doubled.

The cooling unit cools the polylactic acid particles by supplying low temperature air into the cooling unit to contact the air with the polylactic acid particles. The low temperature air forms a rotary airflow in the cooling unit, and the rotational airflow can sufficiently secure the retention time of the polylactic acid particles in the cooling unit. The flow rate of air supplied to the cooling unit may be adjusted depending on the supply amount of polylactic acid particles. According to one embodiment of the present invention, the air may be supplied to the cooling unit at a flow rate of 1 to 10 m³/min. The air may preferably have a temperature of −30 to −20□. By supplying cryogenic air into the cooling unit in comparison with the polylactic acid particles supplied to the cooling unit, the polylactic acid particles are rapidly cooled to properly maintain the internal structure of the high temperature polylactic acid particles during discharge. The polylactic acid particles are reheated again when actually applied for the manufacture of the product. At this time, the reheated polylactic acid has physical properties that are advantageous for processing. The polylactic acid particles cooled by low temperature air are cooled to 40□ or less and discharged. The discharged particles are collected through a cyclone or a bag filter.

Hereinafter, preferred examples are provided to aid the understanding of the present invention. However, the following examples are provided only to more easily understand the present invention, but the present invention is not limited thereto.

EXAMPLES

Example 1: Manufacture of Polylactic Acid Particles According to the Manufacturing Method of the Present Invention 100 wt. % of polylactic acid resin (Natureworks, 2003D, Mw: about 200,000 g/mol, glass transition temperature ($T_g$): about 55□, pyrolysis temperature ($T_d$): about 300□) was fed to a twin-screw extruder (diameter (D)=32 mm, length/diameter (L/D)=40). The twin-screw extruder was set to a temperature condition of about 220□ and an extrusion amount condition of about 5 kg/hr, and then proceeded with extraction. The extruded polylactic acid resin has a viscosity of about 10 Pa·s. The extruded polylactic acid resin was supplied to a nozzle set to the internal temperature of about 300□ and the distal end temperature of about 350□ (A value according to Formula 3 is about 1.2). In addition, air of about 350□ was supplied to the nozzle at a flow rate of about 1 m³/min. The air was supplied to the central portion and the outer portion of the cross section of the nozzle, and the extruded polylactic acid resin was supplied between the central portion and the outer portion of the nozzle to which the air is supplied. The ratio of the cross-sectional areas of the air supplied to the outer portion and the extruded polylactic acid supplied between the central portion and the outer portion to which the air is supplied was about 4.3:1. The polylactic acid resin supplied to the nozzle was granulated by contact with hot air, and the granulated particles were ejected from the nozzle. The ejection angle from the nozzle was about 45° and the ejected particles were fed to a cooling chamber (diameter (D)=1,100 mm, length (L)=3, 500 mm) spaced at a distance of about 200 mm from the nozzle. In addition, the cooling chamber was controlled to form a rotary airflow by injecting air at −25□ at a flow rate of about 6 m³/min before the ejected particles are supplied. Particles sufficiently cooled down to 40□ in the cooling chamber were collected through a cyclone or a bag filter.

Comparative Example 1: Manufacture of Polylactic Acid Particles by Freeze Crushing Method The same polylactic acid resin as in Example 1 was supplied to a screw feeder through a hopper. After removing the moisture while moving the raw material through the screw, the raw material was introduced into a crusher supplied with liquid nitrogen of −130□. The crusher was a Pin Crusher-type crusher. Particle size was controlled via a crushing size determination pin. The particles granulated through the crusher were collected through a cyclone.

Experimental Example 1 Evaluation of Physical Properties of Particles

The physical properties of the particles manufactured according to Example 1 and Comparative Example 1 were measured and shown in Table 1 below.

TABLE 1

| | Average particle diameter (μm)[1] | Aspect ratio[2] | Roundness[3] | Relaxed bulk density[4] (g/cm$^3$) | Compressed bulk density[5] (g/cm$^3$) | Compression degree[6] (%) | Flow time[7] (s) |
|---|---|---|---|---|---|---|---|
| Example 1 | 46.4 | 1.02 ± 0.01 | 0.98 ± 0.01 | 0.494 | 0.547 | 10.2 | 25 |
| Comparative Example 1 | 64.5 | 1.34 ± 0.21 | 0.85 ± 0.25 | 0.457 | 0.515 | 10.8 | 33 |

[1]The average particle diameter of the powder, which is an aggregate of particles, was derived using ImageJ (National Institutes of Health (NIH)) at room temperature. The major axis of each particle is the particle diameter. For the aggregate of particles, the number average value of each particle diameter is the average particle diameter.
[2),3)]The formation of particles was analyzed by image-processing using the same device, and converting into a binary image and then digitizing the degree of spherical shape of individual particles, and the aspect ratio and roundness were derived by Formulas 1 and 2.
[4]Relaxed bulk density: The mass per unit volume is calculated by measuring the mass when the 100 ml cylinder is filled with particles silently (average value of 5 repeated measurements).
[5]Compressed bulk density: The mass per unit volume is calculated by measuring the mass after the arbitrary compression by tapping the cylinder filled with particles by the above 1) with a constant force 10 times (average value of 5 repeated measurements).
[6]Compression degree (%) = (P-A)/P × 100, P: compressed bulk density of the particles, A: relaxed bulk density of the particles.
[7]Flow time: After filling a 100 ml cylinder with the particles and then pouring into the funnel of the device for measuring apparent specific gravity of KS M 3002, the time it takes for the sample to exit completely by opening the exit is measured (average value of 5 repeated measurements).

According to Table 1, the particles of Example 1 have a uniform particle distribution while having the smaller particle diameter as compared to the particles of Comparative Example 1. The particles of Example 1 have a high roundness compared to the particles of Comparative Example 1. The particle of Example 1 has a short flow time, while having a degree of compression similar to that of the particles of Comparative Example 1.

Due to the physical properties, when the polylactic acid particles are used in basic cosmetics and color cosmetics, etc., the compressibility, fluidity and dispersibility of the product may be increased to improve product quality.

Experimental Example 2: DSC Analysis

The particles prepared according to Example 1 and Comparative Example 1 were DSC analyzed, and the results are shown in Table 2 below. Specifically, DSC curves were obtained by increasing the temperature from 0☐ to 200☐ under the rate of temperature rise of 10 ☐/min using differential scanning calorimetry (DSC, Perkin-Elmer, DSC8000). The glass transition temperature (Tg), the melting point (Tm), cold crystallization temperature (Tcc), and the difference between endothermic amount (ΔH1) and exothermic amount (exo-therm) (ΔH2) were derived from each DSC curve.

TABLE 2

| | $T_g$(° C.) | $T_m$(° C.) | $T_{cc}$(° C.) | ΔH1-ΔH2 (J/g) |
|---|---|---|---|---|
| Example 1 | 55 | 140 | 98 | 36 |
| Comparative Example 1 | 59 | 146 | — | 42 |

It was confirmed that the polylactic acid particles of Example 1 show a peak of the cold crystallization temperature at 98☐, whereas the polylactic acid particles of Comparative Example 1 do not show a peak of such cold crystallization temperature. Furthermore, it was confirmed that in the case of Example 1, the difference between the endothermic amount ΔH1 and the exothermic amount ΔH2 is about 36 J/g, whereas in the case of Comparative Example 1, the difference between the endothermic amount ΔH1 and the exothermic amount ΔH2 is about 42 J/g. It is understood that the polylactic acid particles of Example 1 have a relatively high exothermic amount because they have a property of generating heat before the particles are melted by the cold crystallization phenomenon.

If the polylactic acid particles have a peak of cold crystallization temperature as in Example 1, when performing the heating process using such particles, such particles may have an advantage that they can be processed at a low temperature, compared to the processing temperature of the polylactic acid particles of Comparative Example 1.

Comparative Example 2: Manufacture of Polylactic Acid Particles by Solvent Polymerization Method The lactic acid was added to the xylene solvent and stirred, and then a tin-based catalyst and a polyol were added thereto and polymerized at a temperature of about 140☐. The polymer was dissolved in chloroform, precipitated in methanol, and then dried finally to prepare polylactic acid particles having a size of 10 μm.

Experimental Example 3: Analysis of Impurities in Particles

The impurity content of the particles prepared according to Example 1 and Comparative Example 2 was analyzed, and the results are shown in Table 3 below. Specifically, the residual solvent in the particles was measured using a GC/FID device (manufacturer: Agilent, model name: 7890A), and the heavy metals in the particles were measured using an ICP/MS device (manufacturer: Perkinelmer, model name: Nexion300). The impurity content of Table 3 described below is the sum of the content of the residual solvent and the content of the heavy metals in the particles.

TABLE 3

| | Impurity content (ppm) |
|---|---|
| Example 1 | 3 |
| Comparative Example 2 | 61 |

According to Table 3, it was confirmed that in the case of the particles of Comparative Examples 2 and 3, since the solvent is used in the manufacture of the particles, the content of impurities is significantly higher than the particles of Example 1 due to the residual solvent in the particles. In contrast, the particles of Example 1 contained little impurities such as residual solvent except for trace impurities coming from the device during the manufacture of the particles.

All simple modifications or variations of the present invention fall within the scope of the present invention, and the specific scope of protection of the present invention will be clarified by the appended claims.

EXPLANATION OF SYMBOLS d: Vertical distance of two parallel tangent planes
A: Area
10: Nozzle
20: Second air stream
30: Polylactic acid resin stream
40: First air stream

The invention claimed is:

1. Polylactic acid particles which are formed into a continuous matrix phase from a polylactic acid resin and have a particle diameter of 1 to 100 µm,
wherein the polylactic acid particles have a flow time of 20 to 30 seconds.

2. The polylactic acid particles according to claim 1, wherein the impurity content of the polylactic acid particles is 50 ppm or less.

3. The polylactic acid particles according to claim 1, wherein the polylactic acid particles have a peak of cold crystallization temperature ($T_{cc}$) at a temperature between a glass transition temperature ($T_g$) and a melting point ($T_m$) in a differential scanning calorimetry (DSC) curve derived from temperature rise analysis of 10° C./min by the DSC.

4. The polylactic acid particles according to claim 1, wherein the polylactic acid particles have an aspect ratio of 1.00 or more and less than 1.05, calculated by Formula 1 below, and a roundness of 0.95 to 1.00, calculated by Formula 2 below:

$$\text{Aspect ratio} = \text{major axis}/\text{minor axis},\quad [\text{Formula 1}]$$

$$\text{Roundness} = 4 \times \text{area}/(\pi \times \text{major axis}^2).\quad [\text{Formula 2}]$$

5. The polylactic acid particles according to claim 1, wherein the polylactic acid particles have a compression degree of 10 to 15%, calculated by Formula 3 below:

Compression degree=(compressed bulk density−relaxed bulk density)/compressed bulk density× 100.  [Formula 3]

6. The polylactic acid particles according to claim 5, wherein the polylactic acid particles have a compressed bulk density of 0.525 to 0.6 g/cm$^3$.

7. A method for manufacturing the polylactic acid particles of claim 1 comprising:
supplying a polylactic acid resin to an extruder and extruding the polylactic acid resin to form an extruded polylactic acid resin;
supplying the extruded polylactic acid resin and air to a nozzle, bringing the extruded polylactic acid resin into contact with the air to granulate the extruded polylactic acid resin, and then discharging granulated polylactic acid resins to form polylactic acid particles; and
supplying the discharged polylactic acid particles to a cooling unit to cool the polylactic acid particles, and then collecting the cooled polylactic acid particles,
wherein based on a cross section of the nozzle, the air is supplied to a center and an outer portion, and the extruded polylactic acid resin is supplied between the center and the outer portion, and
a ratio of cross-sectional areas of the air supplied to the outer portion and the extruded polylactic acid resin supplied between the central portion and the outer portion is 4:1 to 6:1 based on the cross section of the nozzle.

8. The method for manufacturing the polylactic acid particles according to claim 7, wherein in the supplying the extruded polylactic acid resin and the air to the nozzle, the extruded polylactic acid resin supplied to the nozzle has a melt viscosity of 1 to 10 Pa·s.

9. The method for manufacturing the polylactic acid particles according to claim 7, wherein an inside of the nozzle is maintained at 250 to 350° C.

10. The method for manufacturing the polylactic acid particles according to claim 9, wherein a distal end of the nozzle is maintained at a temperature calculated by Formula 4 below:

Distal end temperature=glass transition temperature ($T_g$)+(decomposition temperature($T_d$)−glass transition temperature($T_g$))×$A$  [Formula 4]

wherein the glass transition temperature and the decomposition temperature are values for polylactic acid, and A is 0.5 to 1.5.

* * * * *